United States Patent [19]

Wilhelm

[11] 4,045,818
[45] Aug. 30, 1977

[54] METHOD AND DEVICE FOR CONTROLLING RADIATION

[76] Inventor: George M. Wilhelm, 236 Stoneycliff Road, Centerville, Mass. 02632

[21] Appl. No.: 635,786

[22] Filed: Nov. 28, 1975

[51] Int. Cl.$^2$ .............................................. H04N 5/65
[52] U.S. Cl. .................................................... 358/245
[58] Field of Search ............................ 178/7.82, 7.85; 358/245, 250, 252, 253

[56] References Cited

U.S. PATENT DOCUMENTS 3,610,994  10/1971  Sheldon ............................. 178/7.82
3,632,873  1/1972  Henkin ............................... 178/7.85

Primary Examiner—Howard W. Britton

[57] ABSTRACT

A method and device for controlling radiation from a television receiving apparatus and controlling the production of electrostatic units, the device comprising a first and second transparent plate juxtaposed against each other and between the plates a thin transparent mineral oil film. The device is further comprised of a means for sealing the mineral oil between the plates and a means for attaching the lens device to the viewing surface of the television receiving apparatus.

13 Claims, 4 Drawing Figures

METHOD AND DEVICE FOR CONTROLLING RADIATION

BACKGROUND

With the advent of color television, a problem faced by many color television manufacturers is the elimination of potentially harmful radiation emanating from a television receiving apparatus and the elimination of the production of electrostatic units in the air. Electrostatic units are generally considered to interfere with the proper functioning of electrical switches, radio and television reception and transmission and with the operation of mechanical devices.

It is thus desirable to control the emanation of radiation from a television receiving apparatus and for controlling the production of electrostatic units.

SUMMARY OF THE INVENTION

An important object of the present invention, therefore is to provide a device which will control radiation emanating from a television receiving apparatus.

Another object of this invention is to provide a device for controlling production of electrostatic units produced by radiation emanating from a television receiving apparatus.

A further object of this invention is to provide a method for controlling radiation emanating from a television receiving apparatus and for controlling the production of electrostatic units.

These and other important objects of this invention will become apparent from the following specification, when taken in connection with the appended drawings, illustrating a preferred embodiment of the device of this invention.

One aspect of this invention is a lens device for controlling radiation emanating from a television receiving apparatus and controlling the production of electrostatic units comprising:

a. a first transparent plate;
b. a second transparent plate juxtaposed against the first transparent plate;
c. a thin transparent mineral oil film between the first and second transparent plates;
d. a means for sealing the edges between the first and second transparent plates whereby the mineral oil is sealed between the plates; and
e. a means for attaching the lens device to the viewing surface of the television receiving apparatus.

Another aspect of this invention is a method of controlling radiation emanating from a television receiving apparatus and controlling production of electrostatic units comprising applying and maintaining a thin transparent mineral oil film, of an effective thickness, to the viewing surface of the television receiving apparatus.

DETAILED DESCRIPTION OF THE INVENTION

Figure 1:
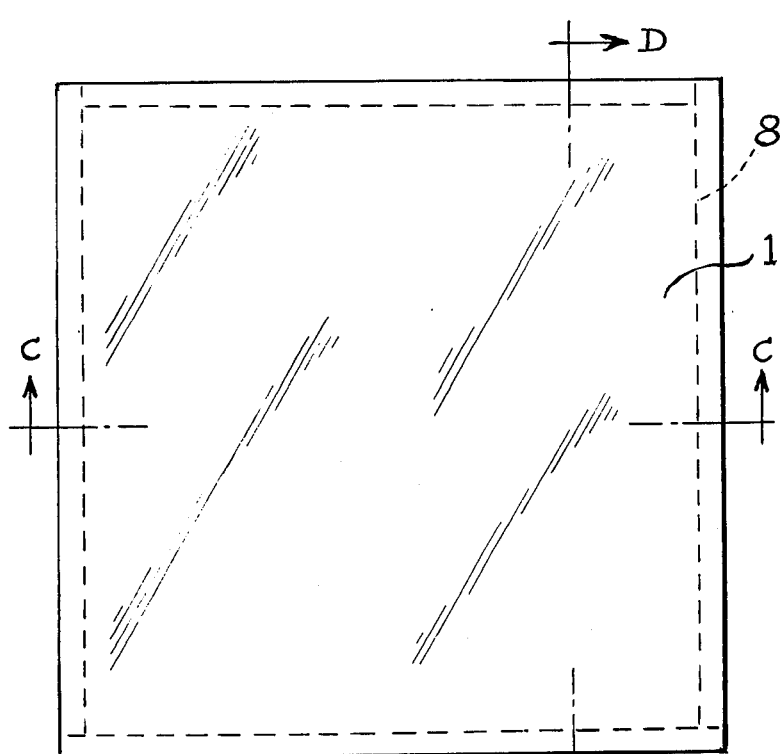
FIG. 1 is a front elevation view of the device of this invention.

Referring now to FIGS. 1 through 4, which describe an embodiment of the device of this invention. The lens device comprises a first transparent plate 1 and a second transparent plate 2 juxtaposed against the first transparent plate.

The plates may be constructed of any transparent material which will not interfere with viewing the picture on the television viewing surface of the television receiving apparatus 3. Preferably the plates are constructed of a glass or a transparent polymer.

Preferably, the plates are both curved i.e. concave 4,5 on the surfaces that are in contact with each other to form a chamber 6 which contains the mineral oil, thereby maintaining a thin transparent mineral oil film 7 over the viewing surface of the television receiving apparatus. However, this invention contemplates any shaped surfaces that are in contact with each other as long as the chamber formed maintains a thin transparent mineral oil film over the television receiving apparatus and does not distort the television picture.

The transparent plates are of a size to substantially cover the viewing surface of the television receiving apparatus which it is desired to place the device upon.

The plates can be of any thickness as long as the total thickness of both plates does not effect, i.e. distort, the television picture in an undesirable manner.

Optionally, the transparent plates may magnify or reduce the television picture.

The thickness of the transparent plate is dependent on the material from which it is constructed, however, it is preferable that each plate be about one-eighth inch thick transparent glass.

A preferred embodiment of this invention is designed to be used on a television receiving apparatus having a 10 inch by 10 inch television viewing surface. The device is therefore constructed of 2 10 × 10 × ⅛ inch transparent glass plates. However, this invention contemplates the use of any size transparent plates adapted to cover the viewing surface of the receiving apparatus.

The lens device is further comprised of a thin transparent mineral oil film 7 between the first and second transparent plates.

The mineral oil must be a transparent mineral oil in order to provide the necessary clarity of television picture and also for radiation and electrostatic unit control. Preferably, the refractive index of the mineral oil is about 1.4 to about 1.8, preferrably 1.4632 and has a viscosity of about 85 Saybolt Universal Seconds to about 90 Saybolt Universal Seconds at 100° F and an API of about 33.5 to about 34, preferrably 88 Saybolt Universal Seconds at 100° F (17.66 Centistokes).

The lens device is further comprised of a means for sealing the edges between the first and second transparent plates 8, whereby the mineral oil is sealed between the plates. The means for sealing may be a simple oil proof sealant placed between curved plates, separator strips between flat plates or more complicated sealing means encompassing interlocking plates.

In a preferred embodiment, separator strips one-sixteenth inch by three-eighths inch glass strips are placed between two ⅛ inch × 10 inch × 10 inch glass plates and fused to the plates.

Another preferred embodiment is to have two concave transparent plates juxtaposed against each other to create the necessary spacing for the film of oil and the two plates are then fused and/or cemented to each other to seal the oil within and between the plates.

Figure 2:
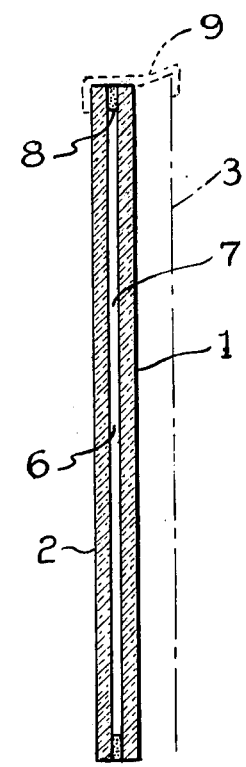
FIG. 2 is a sectional view of the device of this invention taken along D—D of FIG. 1.
Figure 3:
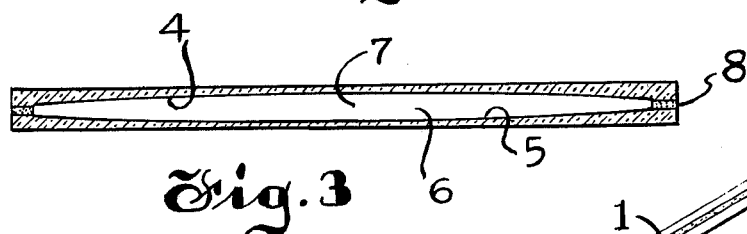
FIG. 3 is a sectional view of the device of this invention taken along C—C of FIG. 1.
Figure 4:
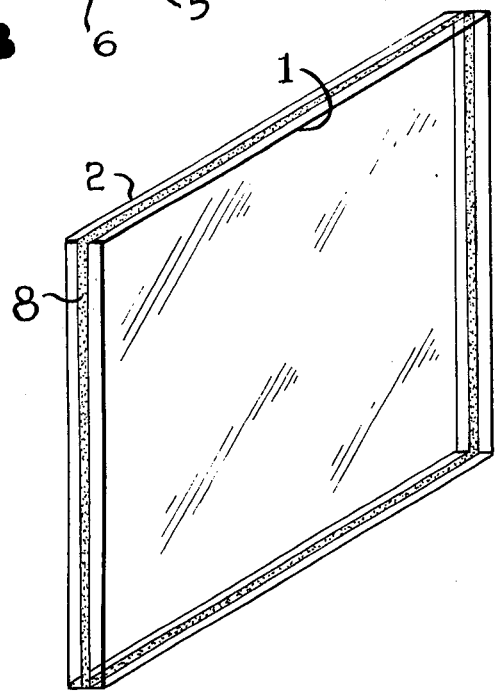
FIG. 4 is a perspective view of the device of this invention.

The lens device is further comprised of a means for attaching the lens device to the viewing surface of the television receiving apparatus. This invention contemplates any temporary or permanent type means for attachment. FIG. 2 describes one means 9 for attachment of the lens device. The lens device may be attached to the television receiving apparatus at, for example, the factory permanently, or purchased by the consumer and attached to the television receiving apparatus temporarily.

In use the lens device is placed over the viewing surface of the television receiving apparatus shielding the viewer from radiation and the environment from the production of electrostatic units.

It is to be understood that this invention is capable of extended application and is not confined to the exact showing of the drawings nor to the precise construction described and therefore, such changes and modifications may be made therein as do not affect the spirit of the invention nor exceed the scope thereof as expressed in the appended claims.

I claim:

1. A lens device for controlling radiation emanating from a television receiving apparatus and controlling the production of electrostatic units without any distortion of the television picture comprising:
   a. a first transparent plate;
   b. a second transparent plate juxtaposed against the first transparent plate;
   c. a composition consisting essentially of a thin transparent mineral oil film between the first and second transparent plates;
   d. a means for sealing the edges between the first and second transparent plates whereby the mineral oil is sealed between the plates; and
   e. a means for attaching the lens device to the viewing surface of the television receiving apparatus.

2. The lens device of claim 1, wherein the first transparent plate and the second transparent plate are made of glass.

3. The lens device of claim 1, wherein the first transparent plate and the second transparent plate are made of a polymer.

4. The lens device of claim 1, wherein the first transparent plate and the second transparent plate are both concave, whereby when juxtaposed against each other a chamber is formed between the plates.

5. The lens device of claim 1, wherein the mineral oil has a refractive index of about 1.4 to about 1.8.

6. The lens device of claim 1, wherein the mineral oil has a viscosity of about 85 Saybolt Universal Seconds to 90 Saybolt Universal Seconds at 100° F.

7. The lens device of claim 1, wherein the mineral oil has an API of about 33.5 to about 34.

8. The lens device of claim 1, wherein the transparent film is about one-sixteenth inch thick.

9. A method of controlling radiation emanating from a television receiving apparatus and controlling the production of electrostatic units without any distortion of the television picture comprising applying and maintaining a composition consisting essentially of a thin transparent mineral oil film, of an effective thickness to the viewing surface of the television receiving apparatus.

10. The method of claim 9, wherein the mineral oil has a refractive index of about 1.4 to about 1.8.

11. The method of claim 9, wherein the mineral oil has a viscosity of about 85 Saybolt Universal Seconds to 90 Saybolt Universal Seconds at 100° F.

12. The method of claim 9, wherein the mineral oil has an API of about 33.5 to about 34.

13. The method of claim 9, wherein the transparent film is about one-sixteenth inch thick.

* * * * *